(12) United States Patent
Kilburn et al.

(10) Patent No.: US 11,374,909 B2
(45) Date of Patent: Jun. 28, 2022

(54) USE OF TRUSTED PLATFORM MODULES FOR CRYPTOGRAPHIC OPERATIONS IN AN INTERNET OF THINGS DEVICE

(71) Applicant: Flex Ltd., Singapore (SG)

(72) Inventors: Christopher Bjorn Kilburn, Menlo Park, CA (US); Ryan Charles Johnson, San Marcos, CA (US)

(73) Assignee: Flex Ltd., Singapore (SG)

( * ) Notice: Subject to any disclaimer, the term of this patent is extended or adjusted under 35 U.S.C. 154(b) by 162 days.

(21) Appl. No.: 16/692,141

(22) Filed: Nov. 22, 2019

(65) Prior Publication Data

US 2021/0160224 A1 May 27, 2021

(51) Int. Cl.
*H04L 29/06* (2006.01)
*H04L 9/40* (2022.01)
*G06F 21/60* (2013.01)

(52) U.S. Cl.
CPC ........ *H04L 63/0428* (2013.01); *G06F 21/602* (2013.01); *H04L 63/164* (2013.01); *H04L 63/166* (2013.01)

(58) Field of Classification Search
CPC . H04L 63/0428; H04L 63/164; H04L 63/166; G06F 21/602
See application file for complete search history.

(56) References Cited

U.S. PATENT DOCUMENTS

| | | | | |
|---|---|---|---|---|
| 7,952,992 B1* | 5/2011 | Ghorishi | ............... | H04L 65/103 370/220 |
| 8,608,057 B1* | 12/2013 | Crews | ................... | G07F 19/206 235/379 |
| 10,133,867 B1* | 11/2018 | Brandwine | ........... | G06F 21/567 |
| 2006/0230439 A1* | 10/2006 | Smith | ................... | H04L 63/061 726/9 |
| 2007/0266256 A1* | 11/2007 | Shah | ....................... | H04L 63/12 713/178 |
| 2010/0037311 A1* | 2/2010 | He | ...................... | H04L 63/0209 726/15 |

(Continued)

OTHER PUBLICATIONS

International Search Report and Written Opinion for International (PCT) Patent Application No. PCT/IB2020/000947, dated Feb. 16, 2021 13 pages.

(Continued)

*Primary Examiner* — Vance M Little
(74) *Attorney, Agent, or Firm* — Sheridan Ross P.C.

(57) ABSTRACT

Providing security functions in an IoT device can comprise executing, by a TPM of the IoT device, a set of cryptographic functions. The set of cryptographic functions can comprise providing a secure unidirectional uplink from the IoT device to one or more communications networks. The set of cryptographic functions can also be executed by a second TPM to provide a secure unidirectional downlink from the one or more communications networks to the IoT device. The processor of the IoT device need not perform cryptographic functions and the processor of the IoT device and a memory of the IoT device can be outside of a secure boundary maintained by the first TPM and the second TPM. Cryptographic information to provide the secure unidirectional uplink and the secure unidirectional downlink can be exchanged between the first TPM and the second TPM.

17 Claims, 6 Drawing Sheets

(56) References Cited

U.S. PATENT DOCUMENTS

| | | | | |
|---|---|---|---|---|
| 2014/0122873 | A1* | 5/2014 | Deutsch | H04L 63/0884 |
| | | | | 713/158 |
| 2015/0242656 | A1* | 8/2015 | Dasari | G06F 21/72 |
| | | | | 713/189 |
| 2016/0094533 | A1* | 3/2016 | Bucci | H04L 63/08 |
| | | | | 726/7 |
| 2018/0196945 | A1 | 7/2018 | Kornegay et al. | |

OTHER PUBLICATIONS

Hamadeh et al., "Area, energy, and time assessment for a distributed TPM for distributed trust in IoT clusters," Integration, The VLSI Journal, A49 Dec. 2016, vol. 58(8), pp. 267-273, 1 page, abstract only.

International Report on Patentability for International (PCT) Patent Application No. PCT/IB2020/000947, dated Oct. 19, 2021 10 pages.

\* cited by examiner

USE OF TRUSTED PLATFORM MODULES FOR CRYPTOGRAPHIC OPERATIONS IN AN INTERNET OF THINGS DEVICE

FIELD OF THE DISCLOSURE

Embodiments of the present disclosure relate generally to methods and systems for cryptography and security of an Internet of Things (IoT) device and more particularly to using Trusted Platform Modules (TPMs) to perform all cryptographic and security operations in an IoT device.

BACKGROUND

The term Internet of Things (IoT) refers to the concept of extending Internet connectivity beyond conventional computing platforms such as personal computers and mobile devices, and into any range of previously non-internet-enabled physical devices. Embedded with electronics, Internet connectivity, and other forms of hardware such as sensors, for example, these devices can communicate and interact with others over the Internet, and they can be remotely monitored and controlled. Accordingly, such devices are commonly used in a wide range of applications. Some of these applications may have special requirements for security and other considerations. For example, government entities require compliance to the Federal Information Processing Standards (FIPS) 140-2 Level 2 and Level 3 for IoT devices used to track government equipment. These standards have very specific requirements on the types of cryptography used, how secrets are protected, and how the trusted part of the system is segregated from the rest of the system. In current IoT devices, processor intensive cryptography like Secure Socket Layer (SSL), is performed on a microprocessor of the IoT device which also performs other operations. Formally validating these mixed systems against the FIPS 140-2 Level 2 and 3 standards is very time consuming and expensive and makes maintenance extremely cumbersome. Hence, there is a need for improved methods and systems for providing cryptographic and security functions in an IoT device.

BRIEF SUMMARY

Embodiments of the disclosure provide systems and methods for using Trusted Platform Modules (TPMs) to perform all cryptographic and security operations in an Internet Of Things (IoT) device. According to one embodiment, an IoT device can comprise a processor and a memory coupled with and readable by the processor of the IoT device. The memory of the IoT device can store therein a set of instructions which, when executed by the processor of the IoT device, causes the processor of the IoT device to perform one or more non-cryptographic functions of the IoT device.

The IoT device can further comprise a first TPM. The first TPM can comprise a processor and a memory coupled with and readable by the processor of the first TPM. The memory of the first TPM can store therein a set of instructions which, when executed by the processor of the first TPM, can cause the processor of the first TPM to perform one or more cryptographic functions of the IoT device. The instructions stored in the memory of the IoT device and executed by the processor of the IoT device do not perform cryptographic functions. Additionally, the processor of the IoT device and the memory of the IoT device can be outside of a secure boundary maintained by the first TPM. The instructions stored in the memory of the first TPM can cause the processor of the first TPM to provide a secure unidirectional link between the IoT device and one or more communications networks in a first direction.

The IoT device can further comprise a second TPM. The second TPM can comprise a processor and a memory coupled with and readable by the processor of the second TPM and storing therein a set of instructions which, when executed by the processor of the second TPM, causes the processor of the second TPM to perform the one or more cryptographic functions of the IoT device. The processor of the IoT device and the memory of the IoT device can also be outside of a secure boundary maintained by the second TPM. The instructions stored in the memory of the second TPM can cause the processor of the second TPM to provide a secure a unidirectional link between the IoT device and one or more communications networks in a second direction, wherein the first direction is opposite the second direction.

For example, the first direction can comprise an uplink from the IoT device to the one or more communications networks and the second direction can comprise a downlink from the one or more communications networks to the IoT device. In some cases, the one or more cryptographic functions of the IoT device performed by the processor of the first TPM can comprise providing Secure Socket Layer (SSL) functions on the uplink of the IoT device and the one or more cryptographic functions of the IoT device performed by the processor of the second TPM can comprise providing SSL functions on the downlink of the IoT device. In such cases, the first TPM and the second TPM can exchange cryptographic information to provide the SSL functions on the uplink and downlink of the IoT device. In another case, the one or more cryptographic functions of the IoT device performed by the processor of the first TPM can comprise providing Transport Layer Security (TLS) functions on the uplink of the IoT device and the one or more cryptographic functions of the IoT device performed by the processor of the second TPM can comprise providing TLS functions on the downlink of the IoT device. In such cases, the first TPM and the second TPM exchange cryptographic information to provide the TLS functions on the uplink and downlink of the IoT device. In either case, and others, the secure boundary maintained by the first TPM, the one or more cryptographic functions of the IoT device performed by the processor of the first TPM, the secure boundary maintained by the second TPM, and the one or more cryptographic functions of the IoT device performed by the processor of the second TPM can be compliant with the Federal Information Processing Standards (FIPS) 140-2 Level 2 and Level 3.

According to another embodiment, a TPM of an IoT device can comprise a processor and a memory coupled with and readable by the processor of the first TPM. The memory can store therein a set of instructions which, when executed by the processor of the TPM, can cause the processor of the TPM to perform one or more cryptographic functions of the IoT device, wherein the IoT device does not perform cryptographic functions. A processor of the IoT device and a memory of the IoT device are outside of a secure boundary maintained by the TPM. The instructions stored in the memory of the TPM can cause the processor of the TPM to provide a secure unidirectional link between the IoT device and one or more communications networks in a first direction.

In some cases, the one or more cryptographic functions of the IoT device performed by the processor of the TPM can comprise providing SSL functions on the secure unidirectional link between the IoT device and the one or more communication networks in the first direction. In such cases, the TPM can exchange cryptographic information with another TPM providing SSL functions on a secure unidirectional link between the IoT device and the one or more communication networks in a second direction, wherein the first direction is opposite the second direction. In another case, the one or more cryptographic functions of the IoT device performed by the processor of the TPM can comprise providing TLS functions on the secure unidirectional link between the IoT device and the one or more communication networks in the first direction. In such cases, the TPM can exchange cryptographic information with another TPM providing TLS functions on a secure unidirectional link between the IoT device and the one or more communication networks in a second direction, wherein the first direction is opposite the second direction.

According to yet another embodiment, a method for providing a set of security functions in an IoT device can comprise executing, by a first TPM of the IoT device, a set of cryptographic functions. The set of cryptographic functions executed by the first TPM can comprise providing a secure unidirectional uplink from the IoT device to one or more communications networks. The set of cryptographic functions can also be executed by a second TPM of the IoT device. The set of cryptographic functions executed by the second TPM can comprise providing a secure unidirectional downlink from the one or more communications networks to the IoT device. The processor of the IoT device need not perform cryptographic functions and the processor of the IoT device and a memory of the IoT device can be outside of a secure boundary maintained by the first TPM and the second TPM. Cryptographic information to provide the secure unidirectional uplink and the secure unidirectional downlink can be exchanged between the first TPM and the second TPM. For example, the cryptographic functions performed by the first TPM and second TPM can comprise at least one of providing SSL functions on the uplink and downlink or providing TLS functions on the uplink and downlink.

Figure 1:
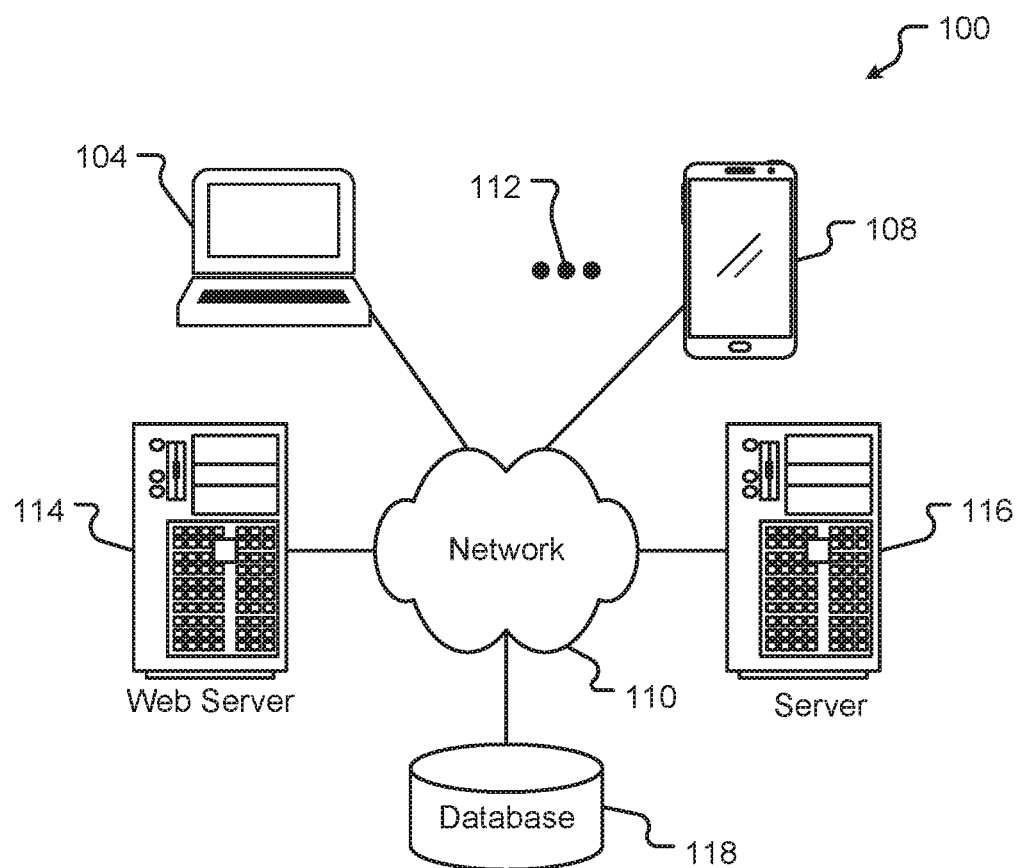
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file)

server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
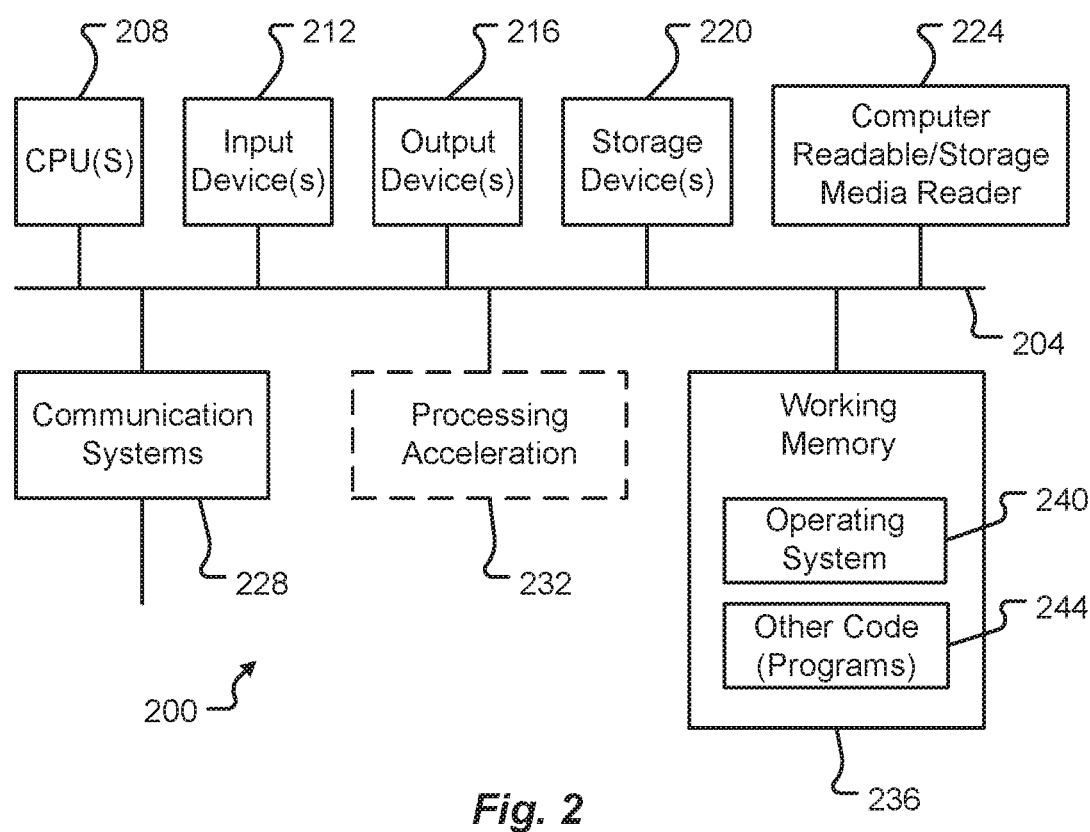
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
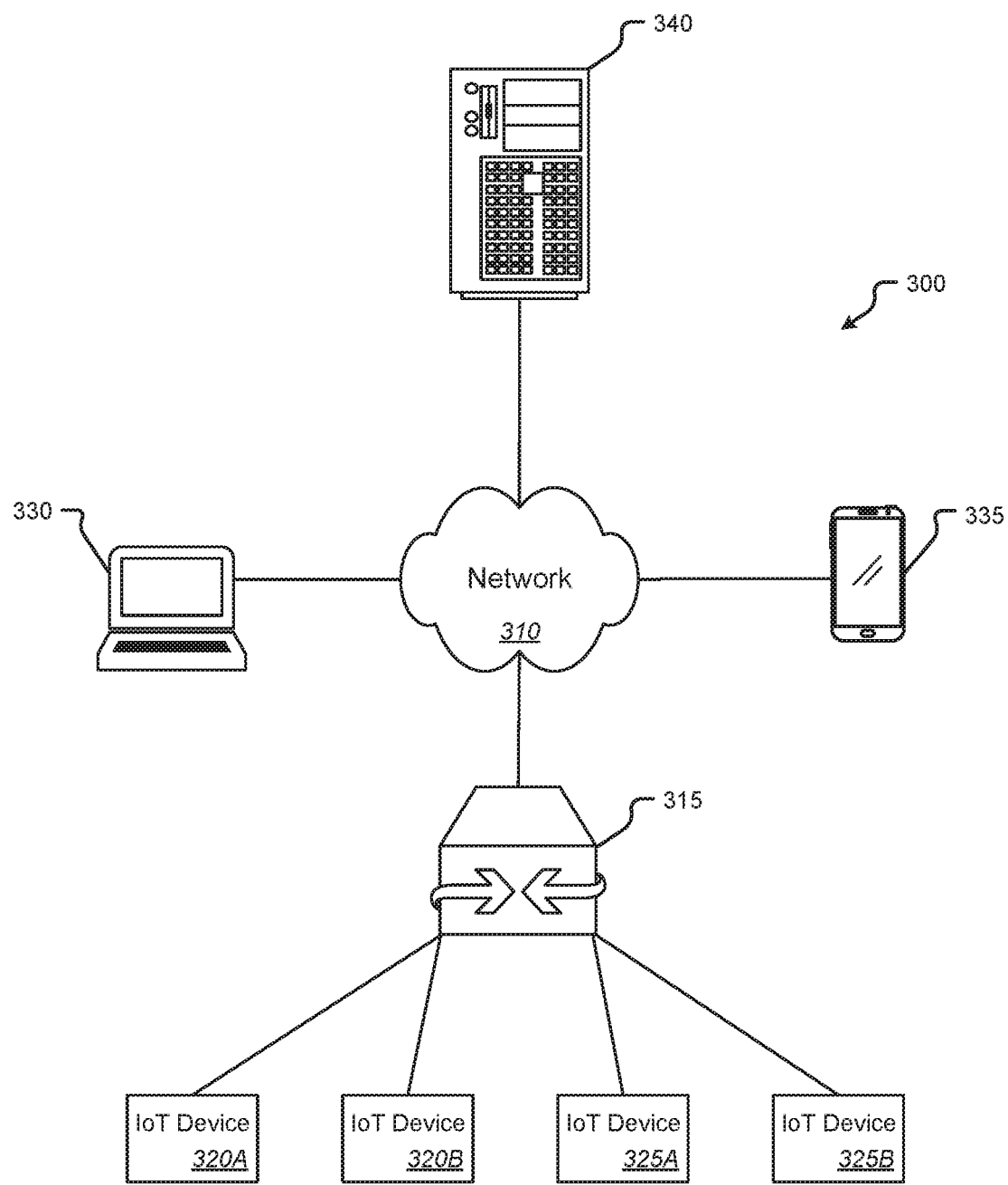
FIG. 3 is a block diagram illustrating an exemplary Internet of Things (IoT) environment in which embodiments of the present disclosure may be implemented.

FIG. 3 is a block diagram illustrating an exemplary Internet of Things (IoT) environment in which embodiments of the present disclosure may be implemented. This example illustrates an IoT environment 300 comprising one or more networks 310 which can include, but is not limited to, the Internet, one or more cellular and/or other wireless communications networks, and/or any number of other wired and/or wireless networks as known in the art. In some cases, a gateway device 315 can be communicatively coupled with the network 310 and any number and variety of IoT device 320A, 320B, 320C and/or 320D can connect to and communicate with the gateway device 315 via a wired or wireless connection. In other cases, one or more IoT devices may be wired or wirelessly connected with the network 310 without use of the gateway device 315. In either case, the IoT devices 320A, 320B, 320C and/or 320D can access, or be access by, any number and variety of computer systems 330, mobile devices 335, servers 340, e.g., providing a variety of online services as known in the art.

Embodiments of the present disclosure relate generally to providing cryptography and security of the IoT devices 320A, 320B, 320C and/or 320D and more particularly to using Trusted Platform Modules (TPMs) to perform all cryptographic and security operations in an IoT devices 320A, 320B, 320C and/or 320D. As known in the art, TPMs are typically used for storage of cryptographic secrets and authentication but do not perform all cryptographic operations. Embodiments of the present disclosure utilize TPMs (not shown here) within each IoT device 320A, 320B, 320C and/or 320D to perform all cryptographic operations including Transport Layer Security (TLS) and/or Secure Socket Layer (SSL) functions by modifying the software stack to use the TPM for the cryptographic operations that are to be performed inside the secure boundary according to requirements or standards such as Federal Information Processing Standards (FIPS) 140-2 or 140-3, for example.

Figure 4:
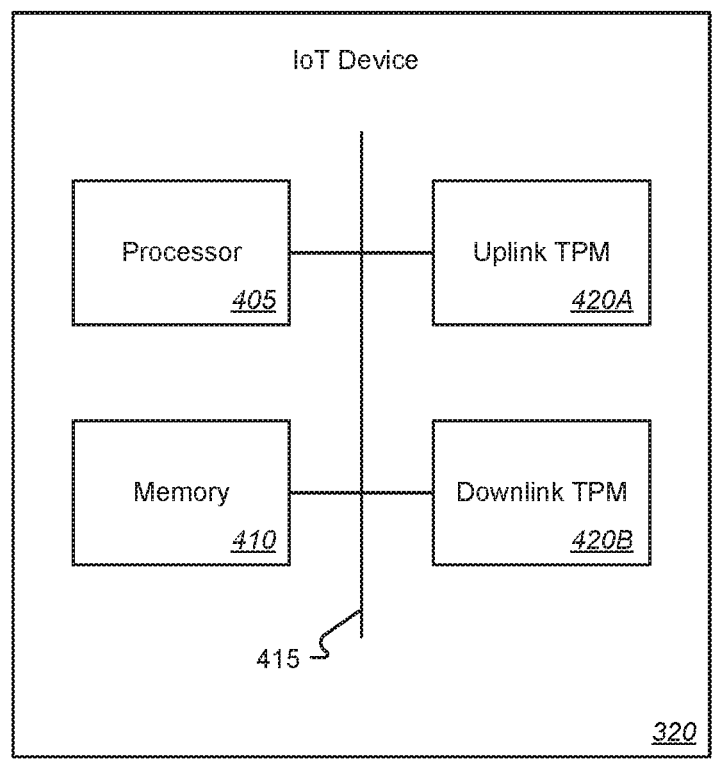
FIG. 4 is a block diagram illustrating components of an exemplary IoT device according to one embodiment of the present disclosure.

FIG. 4 is a block diagram illustrating components of an exemplary IoT device according to one embodiment of the present disclosure. As illustrated in this example, an IoT device 320 can comprise a processor 405. The processor 405 may correspond to one or many computer processing devices. For instance, the processor 405 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 405 may be provided as a microprocessor, Central Processing Unit (CPU), or plurality of microprocessors that are configured to execute the instructions sets stored in a memory 410. Upon executing the instruction sets stored in memory 410, the processor 405 enables various functions of the IoT device 320 as known in the art.

The memory 410 can be coupled with and readable by the processor 405 via a communications bus 415. The memory 410 may include any type of computer memory device or collection of computer memory devices. Non-limiting examples of memory 410 include Random Access Memory (RAM), Read Only Memory (ROM), flash memory, Electronically-Erasable Programmable ROM (EEPROM), Dynamic RAM (DRAM), etc. The memory 410 may be configured to store the instruction sets depicted in addition to temporarily storing data for the processor 405 to execute various types of routines or functions.

The processor 405 can also be coupled with one or more TPMs 420A and 420B as introduced above. Generally speaking, and as known in the art, a TPM can comprise a dedicated microcontroller designed to secure hardware through integrated cryptographic keys. However, typical TPMs rely on the processor 405 of the IoT device 320 to perform many cryptographic and security functions. According to one embodiment, a TPM 420 as described herein can be adapted to perform all cryptographic and security functions of the IoT device 320. As noted above, one or more TPMs 420A and 420B of the IoT device 320 can be adapted to perform TLS and/or SSL functions by modifying the software stack to use the TPM for the cryptographic operations rather than the processor 405 of the IoT device 320. These operations can be performed inside the secure boundary established by the TPMs 420A and 420B according to requirements or standards such as FIPS 140-2 or 140-3, for example.

According to one embodiment, and as illustrated here, the IoT device 320 can include two TPMs 420A and 420B. One TPM 420A can be used to provide an uplink from the IoT device to a network 310 while the other TPM 420B can be used to provide a downlink from the network 310 to the IoT device 320. In such embodiments, the cryptographic secrets, e.g., keys, certificates, etc., needed for communication can be shared securely between the TPMs 420A and 420B.

In this way, embodiments can completely segregate operations performed to comply with standards such as FIPS 140-2 Level 2 or 3 in the IoT device 320 to one or more TPMs 420A and 420B. By removing other components of the IoT device 320, including the processor 405 and memory 410, from the secure boundary defined by the standards, changes can be made to those parts of the IoT device 320 without requiring costly revalidation of standard compliance with every software change. This greatly reduces cost associated with maintaining compliance and eliminates the lengthy delays in getting new software approved, speeding up software deployments and enabling an IoT hardware vendor to provide updates to government customers at the same speed commercial customers receive updates without impacting standard compliance.

Stated another way, an IoT device 320 can comprise a processor 405 and a memory 410 coupled with and readable by the processor 405 of the IoT device 320. The memory 410 of the IoT device 320 can store therein a set of instructions which, when executed by the processor 405 of the IoT device 320, causes the processor 405 of the IoT device 320 to perform one or more non-cryptographic functions of the IoT device 320.

The IoT device 320 can further comprise a first TPM 420A. As will be described in greater detail below with reference to FIG. 5, the first TPM 420A can comprise a processor and a memory coupled with and readable by the processor of the first TPM 420A. The memory of the first TPM 420A can store therein a set of instructions which, when executed by the processor of the first TPM 420A, can cause the processor of the first TPM 420A to perform one or more cryptographic functions of the IoT device 320. The instructions stored in the memory 410 of the IoT device 320 and executed by the processor 405 of the IoT device 320 do not perform cryptographic functions. Additionally, the processor 405 of the IoT device 320 and the memory 410 of the IoT device 320 can be outside of a secure boundary maintained by the first TPM 420A. The instructions stored in the memory of the first TPM 420A can cause the processor of the first TPM 420A to provide a secure unidirectional link between the IoT device 320 and one or more communications networks 310 in a first direction.

The IoT device 320 can further comprise a second TPM 420B. As will be described in greater detail below with reference to FIG. 5, the second TPM 420B can comprise a processor and a memory coupled with and readable by the processor of the second TPM 420B and storing therein a set of instructions which, when executed by the processor of the second TPM 420B, causes the processor of the second TPM 420B to perform the one or more cryptographic functions of the IoT device 320. The processor 405 of the IoT device 320 and the memory 410 of the IoT device 320 can also be outside of a secure boundary maintained by the second TPM 420B. The instructions stored in the memory of the second TPM 420B can cause the processor of the second TPM 420B to provide a secure a unidirectional link between the IoT device 320 and one or more communications networks 310 in a second direction, wherein the first direction is opposite the second direction.

For example, the first direction can comprise an uplink from the IoT device 320 to the one or more communications networks 310 and the second direction can comprise a downlink from the one or more communications networks 310 to the IoT device 320. In some cases, the one or more cryptographic functions of the IoT device 320 performed by the processor of the first TPM 420A can comprise providing SSL functions on the uplink of the IoT device and the one or more cryptographic functions of the IoT device 320 performed by the processor of the second TPM 420B can comprise providing SSL functions on the downlink of the IoT device 320. In such cases, the first TPM 420A and the second TPM 420B can exchange cryptographic information to provide the SSL functions on the uplink and downlink of the IoT device. In another case, the one or more cryptographic functions of the IoT device 320 performed by the processor of the first TPM 420A can comprise providing TLS functions on the uplink of the IoT device 320 and the one or more cryptographic functions of the IoT device 320 performed by the processor of the second TPM 420B can comprise providing TLS functions on the downlink of the IoT device 320. In such cases, the first TPM 420A and the second TPM 420B can exchange cryptographic information to provide the TLS functions on the uplink and downlink of the IoT device 320. In either case, and others, the secure boundary maintained by the first TPM 420A, the one or more cryptographic functions of the IoT device 320 performed by the processor of the first TPM 420A, the secure boundary maintained by the second TPM 420B, and the one or more cryptographic functions of the IoT device 320 performed by the processor of the second TPM 420B can be compliant with the FIPS 140-2 Level 2 and Level 3 or other standard.

Figure 5:
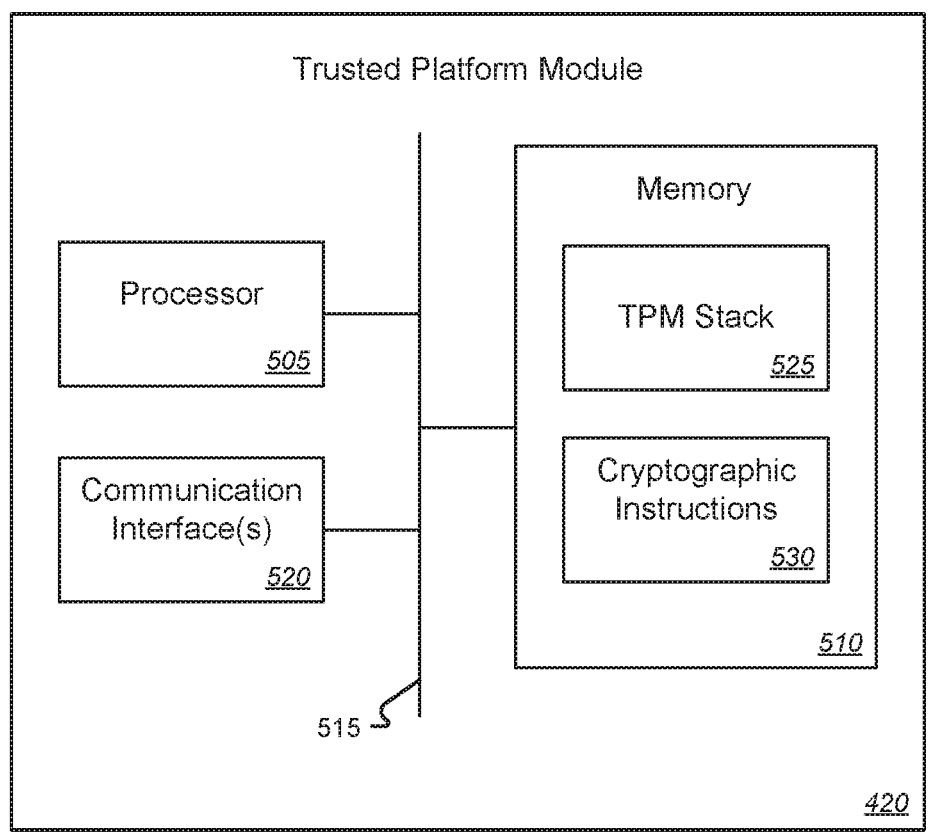
FIG. 5 is a block diagram illustrating components of an exemplary Trusted Platform Module (TPM) according to one embodiment of the present disclosure.

FIG. 5 is a block diagram illustrating components of an exemplary Trusted Platform Module (TPM) according to one embodiment of the present disclosure. According to another embodiment, and as illustrated in this example, a TPM 420 of an IoT device 320 as described above can comprise a processor 505, such as any of the processing devices described herein and as commonly used to implement a TPM, and a memory 510, such as any of the volatile and/or non-volatile memory devices described herein and as commonly used to implement a TPM, coupled with and readable by the processor 505 of the TPM 420 via a communications bus 515. The memory 510 can store therein a set of instructions, including but not limited to, a TPM stack 525 and cryptographic instructions 530 adapted to provide security and cryptographic functions for the IoT device 320 as described herein. For example, the TPM stack 525 and cryptographic instructions 530, when executed by the processor 505 of the TPM 420, can cause the processor 505 of the TPM 420 to perform one or more cryptographic functions of the IoT device 320, wherein the IoT device 320 does not perform cryptographic functions. A processor of the IoT device 320 and a memory of the IoT device 320 can be outside of a secure boundary maintained by the TPM 420.

In some cases, the instructions stored in the memory 510 of the TPM 420 can cause the processor 505 of the TPM 420 to provide a secure unidirectional link between the IoT device 320 and one or more communications networks 310 in a first direction. For example, the one or more cryptographic functions of the IoT device 320 performed by the processor 505 of the TPM 420 can comprise providing SSL functions on the secure unidirectional link between the IoT device 320 and the one or more communication networks 310 in the first direction. In such cases, the TPM 420 can exchange cryptographic information with another TPM providing SSL functions on a secure unidirectional link between the IoT device 320 and the one or more communication networks in a second direction, wherein the first direction is opposite the second direction. In another case, the one or more cryptographic functions of the IoT device 320 performed by the processor 505 of the TPM 420 can comprise providing TLS functions on the secure unidirectional link between the IoT device 320 and the one or more communication networks 310 in the first direction. In such cases, the TPM 420 can exchange cryptographic information with another TPM providing TLS functions on a secure unidirectional link between the IoT device 320 and the one or more communication networks 310 in a second direction, wherein the first direction is opposite the second direction.

Figure 6:
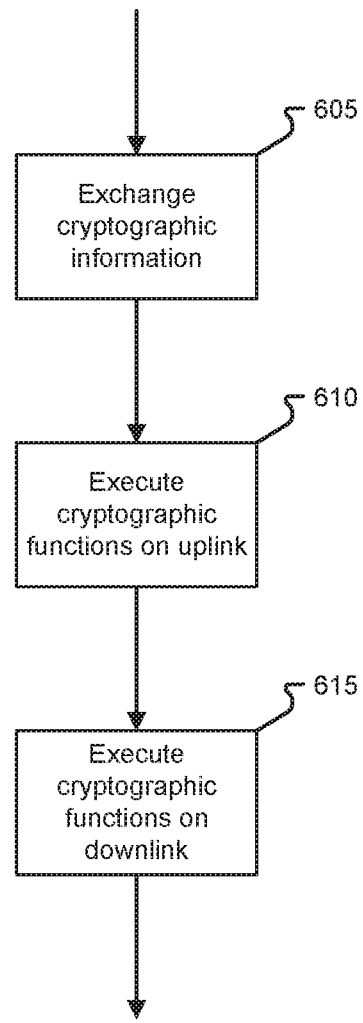
FIG. 6 is a flowchart illustrating an exemplary process for providing a set of security functions in an IoT device according to one embodiment of the present disclosure.

FIG. 6 is a flowchart illustrating an exemplary process for providing a set of security functions in an IoT device according to one embodiment of the present disclosure. According to one embodiment, and as illustrated in this example, providing a set of security functions in an IoT device can comprise exchanging 605 cryptographic information to provide the secure unidirectional uplink and the secure unidirectional downlink between a first TPM and a second TPM. For example, the cryptographic functions performed by the first TPM and second TPM can comprise at least one of providing SSL functions on the uplink and downlink or providing TLS functions on the uplink and downlink. A set of cryptographic functions can be executed 610 by the first TPM of the IoT device. The set of cryptographic functions executed 610 by the first TPM can comprise providing a secure unidirectional uplink from the IoT device to one or more communications networks. The set of cryptographic functions can also be executed 615 by the second TPM of the IoT device. The set of cryptographic functions executed 615 by the second TPM can comprise providing a secure unidirectional downlink from the one or more communications networks to the IoT device. As noted above and in this way, the processor of the IoT device need not perform cryptographic functions and the processor of the IoT device and a memory of the IoT device can be outside of a secure boundary maintained by the first TPM and the second TPM.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An Internet of Things (IoT) device comprising:
a processor;

a memory coupled with and readable by the processor of the IoT device and storing therein a set of instructions which, when executed by the processor of the IoT device, causes the processor of the IoT device to perform one or more non-cryptographic functions of the IOT device;

a first Trusted Platform Module (TPM), the first TPM comprising:
  a processor; and
  a memory coupled with and readable by the processor of the first TPM and storing therein a set of instructions which, when executed by the processor of the first TPM, causes the processor of the first TPM to perform one or more cryptographic functions of the IoT device, wherein the set of instructions stored in the memory of the IoT device and executed by the processor of the IoT device do not perform cryptographic functions, wherein the processor of the IoT device and the memory of the IoT device are outside of a secure boundary maintained by the first TPM, and wherein the set of instructions stored in the memory of the first TPM cause the processor of the first TPM to provide a secure unidirectional link between the IoT device and one or more communications networks in a first direction; and a second TPM, the second TPM comprising:
  a processor; and
  a memory coupled with and readable by the processor of the second TPM and storing therein a set of instructions which, when executed by the processor of the second TPM, causes the processor of the second TPM to perform the one or more cryptographic functions of the IoT device, wherein the processor of the IoT device and the memory of the IoT device are outside of a secure boundary maintained by the second TPM, and wherein the set of instructions stored in the memory of the second TPM cause the processor of the second TPM to provide a secure a unidirectional link between the IoT device and one or more communications networks in a second direction, wherein the first direction is opposite the second direction.

2. The IoT device of claim 1, wherein the first direction comprises an uplink from the IoT device to the one or more communications networks and the second direction comprises a downlink from the one or more communications networks to the IoT device.

3. The IoT device of claim 2, wherein the secure boundary maintained by the first TPM, the one or more cryptographic functions of the IoT device performed by the processor of the first TPM, the secure boundary maintained by the second TPM, and the one or more cryptographic functions of the IoT device performed by the processor of the second TPM are compliant with Federal Information Processing Standards (FIPS) 140-2 Level 2 and Level 3.

4. The IoT device of claim 2, wherein the one or more cryptographic functions of the IoT device performed by the processor of the first TPM comprise providing Secure Socket Layer (SSL) functions on the uplink of the IoT device and wherein the one or more cryptographic functions of the IoT device performed by the processor of the second TPM comprise providing SSL functions on the downlink of the IoT device.

5. The IoT device of claim 4, wherein the first TPM and the second TPM exchange cryptographic information to provide the SSL functions on the uplink and downlink of the IoT device.

6. The IoT device of claim 2, wherein the one or more cryptographic functions of the IoT device performed by the processor of the first TPM comprise providing Transport Layer Security (TLS) functions on the uplink of the IoT device and wherein the one or more cryptographic functions of the IoT device performed by the processor of the second TPM comprise providing TLS functions on the downlink of the IoT device.

7. The IoT device of claim 6, wherein the first TPM and the second TPM exchange cryptographic information to provide the TLS functions on the uplink and downlink of the IoT device.

8. A Trusted Platform Module (TPM) of an Internet of Things (IoT) device, the TPM comprising:
  a processor; and
  a memory coupled with and readable by the processor of the TPM and storing therein a set of instructions which, when executed by the processor of the TPM, causes the processor of the TPM to perform one or more cryptographic functions of the IoT device, wherein the IoT device does not perform cryptographic functions, wherein a processor of the IoT device and a memory of the IoT device are outside of a secure boundary maintained by the TPM, wherein the set of instructions stored in the memory of the TPM cause the processor of the TPM to provide a secure unidirectional link between the IoT device and one or more communications networks in a first direction, wherein the TPM exchanges cryptographic information with another TPM providing a secure unidirectional link between the IoT device and the one or more communication networks in a second direction, wherein the first direction is opposite the second direction.

9. The TPM of claim 8, wherein the one or more cryptographic functions of the IoT device performed by the processor of the TPM comprise providing Secure Socket Layer (SSL) functions on the secure unidirectional link between the IoT device and the one or more communication networks in the first direction.

10. The TPM of claim 9, wherein the another TPM provides SSL functions on the secure unidirectional link between the IoT device and the one or more communication networks in the second direction.

11. The TPM of claim 8, wherein the one or more cryptographic functions of the IoT device performed by the processor of the TPM comprise providing Transport Layer Security (TLS) functions on the secure unidirectional link between the IoT device and the one or more communication networks in the first direction.

12. The TPM of claim 11, wherein another TPM provides TLS functions on the secure unidirectional link between the IoT device and the one or more communication networks in the second direction.

13. The TPM of claim 8, wherein the first direction comprises an uplink from the IoT device to the one or more communications networks and the second direction comprises a downlink from the one or more communications networks to the IoT device.

14. The TPM of claim 13, wherein the secure boundary maintained by the first TPM, the one or more cryptographic functions of the IoT device performed by the processor of the first TPM, the secure boundary maintained by the second TPM, and the one or more cryptographic functions of the IoT device performed by the processor of the second TPM are compliant with Federal Information Processing Standards (FIPS) 140-2 Level 2 and Level 3.

15. A method for providing a set of security functions in an Internet of Things (IoT) device, the method comprising:

executing, by a first Trusted Platform Module (TPM) of the IoT device, a set of cryptographic functions, wherein the set of cryptographic functions executed by the first TPM comprise providing a secure unidirectional uplink from the IoT device to one or more communications networks;

executing, by a second TPM of the IoT device, the set of cryptographic functions, wherein the set of cryptographic functions executed by the second TPM comprise providing a secure unidirectional downlink from the one or more communications networks to the IoT device, wherein a processor of the IoT device does not perform cryptographic functions and wherein the processor of the IoT device and a memory of the IoT device are outside of a secure boundary maintained by the first TPM and the second TPM; and exchanging, between the first TPM and the second TPM, cryptographic information to provide the secure unidirectional uplink and the secure unidirectional downlink.

16. The method of claim 15, wherein the set of cryptographic functions exchanged by the first TPM and second TPM comprise at least one of providing Secure Socket Layer (SSL) functions on the unidirectional uplink and secure unidirectional downlink or providing Transport Layer Security (TLS) functions on the unidirectional uplink and secure unidirectional downlink.

17. The method of claim 15, wherein the secure boundary maintained by the first TPM, the set of cryptographic functions of the IoT device performed by the processor of the first TPM, the secure boundary maintained by the second TPM, and the set of cryptographic functions of the IoT device performed by the processor of the second TPM are compliant with Federal Information Processing Standards (FIPS) 140-2 Level 2 and Level 3.

* * * * *